US012687699B2

(12) United States Patent
Chiu et al.

(10) Patent No.: US 12,687,699 B2
(45) Date of Patent: Jul. 21, 2026

(54) OPTICAL LENS

(71) Applicant: Taiwan ZMAX Optech Co., Ltd., Hsinchu County (TW)

(72) Inventors: Wei-Ting Chiu, Hsinchu County (TW); Sheng-Tang Lai, Hsinchu County (TW); Yuan-Long Cai, Hsinchu County (TW); Chia-Chen Kung, Hsinchu County (TW); Cheng-Chien Hsieh, Hsinchu County (TW)

(73) Assignee: Taiwan ZMAX Optech Co., Ltd., Hsinchu County (TW)

( * ) Notice: Subject to any disclaimer, the term of this patent is extended or adjusted under 35 U.S.C. 154(b) by 250 days.

(21) Appl. No.: 18/624,068

(22) Filed: Apr. 1, 2024

(65) Prior Publication Data

US 2025/0224593 A1 Jul. 10, 2025

(30) Foreign Application Priority Data

Jan. 4, 2024 (TW) .................................. 113100324

(51) Int. Cl.
G02B 13/00 (2006.01)

(52) U.S. Cl.
CPC ................................ G02B 13/0045 (2013.01)

(58) Field of Classification Search
CPC ............................ G02B 13/0045; G02B 13/06
See application file for complete search history.

(56) References Cited

U.S. PATENT DOCUMENTS

| | | | |
|---|---|---|---|
| 2013/0265653 A1 | 10/2013 | Kimura | |
| 2014/0078605 A1 | 3/2014 | Ohashi | |
| 2018/0275379 A1 | 9/2018 | Cheng et al. | |
| 2019/0155006 A1 | 5/2019 | Lin et al. | |
| 2019/0204569 A1* | 7/2019 | Jiang ..................... | G02B 13/06 |
| 2020/0132974 A1 | 4/2020 | Kimura et al. | |
| 2022/0373768 A1* | 11/2022 | Kurashige ........... | G02B 13/006 |
| 2023/0280570 A1 | 9/2023 | Chang | |

FOREIGN PATENT DOCUMENTS

| | | |
|---|---|---|
| CN | 112612130 A | 4/2021 |
| CN | 113805318 A | 12/2021 |
| TW | 201835630 A | 10/2018 |
| TW | 202336486 A | 9/2023 |

* cited by examiner

*Primary Examiner* — Charles S Chang
(74) *Attorney, Agent, or Firm* — Li & Cai Intellectual Property Office

(57) ABSTRACT

An optical lens includes a front lens group, a rear lens group, and an aperture. The front lens group includes front lenses that include at least two aspherical lenses. The rear lens group includes rear lenses that include at least one adhered lens and an aspheric lens. The aperture is located between the front lens group and the rear lens group. The front lens group and the rear lens group have positive diopters, and a total quantity of lenses of the plurality of front lenses and the plurality of rear lenses is at least four. The optical lens meets a condition of: 0.6>an effective focal length of the front lens group/an effective focal length of the rear lens group>0.35.

9 Claims, 9 Drawing Sheets

OPTICAL LENS

CROSS-REFERENCE TO RELATED PATENT APPLICATION

This application claims the benefit of priority to Taiwan Patent Application No. 113100324, filed on Jan. 4, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an optical field, and more particularly to an optical lens.

BACKGROUND OF THE DISCLOSURE

Existing wide-angle lenses are difficult to reduce in size due to the limitations of lens shape and lens material, and an imaging quality of existing wide-angle lenses is poor due to an image taken with a wide field of view and a large aperture. Therefore, how to develop an optical lens satisfying requirements of having a wide field of view, a high image quality, resistance to environmental changes, miniaturization, and a low thermal drift, has been an area of research in this field.

SUMMARY OF THE DISCLOSURE

In response to the above-referenced technical inadequacies, the present disclosure provides an optical lens.

In order to solve the above-mentioned problems, one of the technical aspects adopted by the present disclosure is to provide an optical lens. The optical lens includes a front lens group, a rear lens group, and an aperture. The front lens group includes a plurality of front lenses. The plurality of front lenses include at least two aspherical lenses, one of the at least two aspherical lenses is a negative lens and has a surface facing an image side, another one of the at least two aspherical lenses is a negative lens and has a surface facing an object side, and the surface of the one of the at least two aspherical lenses and the surface of the another one of the at least two aspherical lenses are concave surfaces. The rear lens group includes a plurality of rear lenses. The plurality of rear lenses include at least one adhered lens and an aspheric lens. The aperture is located between the front lens group and the rear lens group. The front lens group and the rear lens group have positive diopters, and a total quantity of lenses of the plurality of front lenses and the plurality of rear lenses is at least four. The optical lens meets a condition of: 0.6>an effective focal length of the front lens group/an effective focal length of the rear lens group>0.35.

In one of the possible or preferred embodiments, the plurality of rear lenses include a first rear lens and a second rear lens sequentially arranged from the object side toward the image side, the first rear lens being an adhered lens, and the second rear lens being an aspherical lens. The first rear lens includes a front lens piece, a middle lens piece, and a rear lens piece, the front lens piece is connected to one side of the middle lens piece, and the rear lens piece is connected to another side of the middle lens piece. An absolute value of a difference between a dispersion coefficient of the middle lens piece and a dispersion coefficient of the front lens piece and the rear lens piece is greater than 30.

In one of the possible or preferred embodiments, the plurality of front lenses include a first front lens, a second front lens, a third front lens, and a fourth front lens sequentially arranged from the object side toward the image side, the second front lens and the third front lens being aspherical lenses.

In one of the possible or preferred embodiments, diopters of the first front lens, the second front lens, the third front lens, the fourth front lens, the front lens piece, the middle lens piece, the rear lens piece, and the second rear lens are negative, negative, negative, positive, negative, positive, negative, and positive, in a sequence of the first front lens, the second front lens, the third front lens, the fourth front lens, the front lens piece, the middle lens piece, the rear lens piece, and the second rear lens.

In one of the possible or preferred embodiments, the first front lens, the fourth front lens, and the first rear lens are made of glass, and the second front lens, the third front lens, and the second rear lens are made of plastic.

In one of the possible or preferred embodiments, the plurality of front lenses include a first front lens, a second front lens, a third front lens, a fourth front lens, and a fifth front lens sequentially from the object side toward the image side, the third front lens and the fourth front lens being aspherical lenses.

In one of the possible or preferred embodiments, diopters of the first front lens, the second front lens, the third front lens, the fourth front lens, the fifth front lens, the front lens piece, the middle lens piece, the rear lens piece, and the second rear lens are negative, negative, negative, negative, positive, negative, positive, negative, and positive, or negative, negative, negative, negative, positive, positive, negative, positive, and positive, in a sequence of the first front lens, the second front lens, the third front lens, the fourth front lens, the fifth front lens, the front lens piece, the middle lens piece, the rear lens piece, and the second rear lens.

In one of the possible or preferred embodiments, the first front lens, the second front lens, the fifth front lens, and the first rear lens are made of glass, and the third front lens, the fourth front lens, and the second rear lens are made of plastic.

In one of the possible or preferred embodiments, the optical lens meets a condition of: 17<TTL/EFL<17.5, a TTL being a total length of the optical lens, and an EFL being an effective focal length of the optical lens.

In one of the possible or preferred embodiments, an angle of a field of view of the optical lens is less than or equal to 185 degrees. A relationship of an angle of half of the field of view of the optical lens corresponding to an image height meets a condition of: −0.6>90/an image height when the angle of half of the field of view of the optical lens is 90 degrees-80/an image height when the angle of half of the field of view of the optical lens is 80 degrees>−0.4.

Therefore, in the optical lens provided by the present disclosure, by virtue of "the front lens group including a plurality of front lenses; the plurality of front lenses including at least two aspherical lenses, one of the at least two aspherical lenses being a negative lens and having a surface facing an image side, another one of the at least two aspherical lenses being a negative lens and having a surface facing an object side, and the surface of the one of the at least two aspherical lenses and the surface of the another one of the at least two aspherical lenses being concave surfaces; the rear lens group including a plurality of rear lenses; the plurality of rear lenses including at least one adhered lens and an aspheric lens; the aperture being located between the front lens group and the rear lens group; the front lens group and the rear lens group having positive diopters, and a total quantity of lenses of the plurality of front lenses and the plurality of rear lenses being at least four; the optical lens meeting a condition of: 0.6>an effective focal length of the front lens group/an effective focal length of the rear lens group>0.35," a quantity of lenses can be effectively reduced, an optical aberration can be improved, and the manufacturing cost can be lowered for the optical lens. Furthermore, the optical lens can have an improved optical effect.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
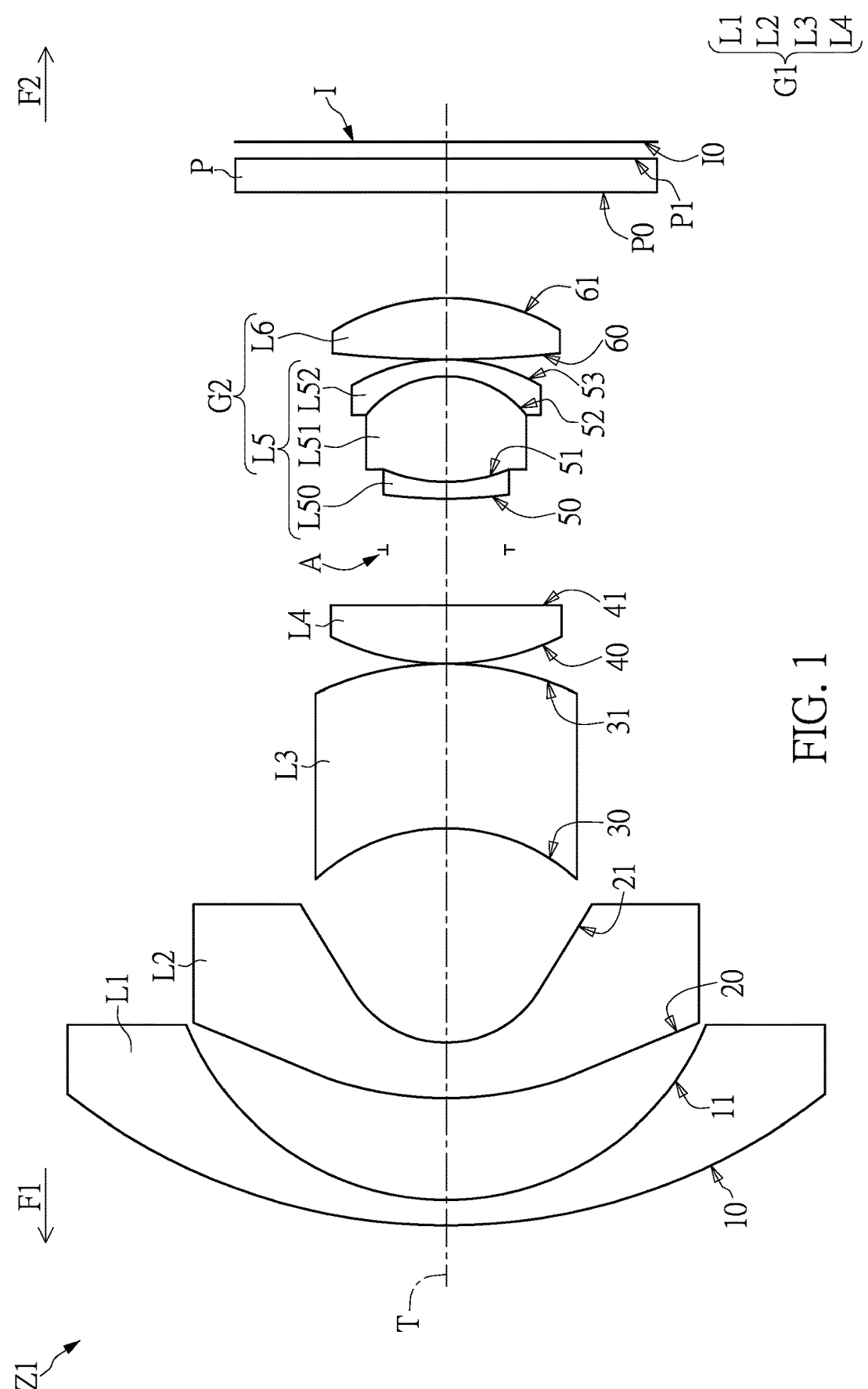
FIG. 1 is a schematic view of a structure of an optical lens of a first embodiment according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, FIG. 1 is a schematic view of a structure of an optical lens of a first embodiment according to the present disclosure. As shown in FIG. 1, the present disclosure provides an optical lens Z1 that can be an imaging lens used in the fields of security surveillance, automotive, or motion photography, but the present disclosure is not limited thereto. The optical lens Z1 of the present disclosure can be a fisheye lens that uses a plurality of aspherical lenses to enhance a resolving performance, and uses a positive diopter lens to receive light in a wide angle.

The optical lens Z1 may have an optical axis T. The optical lens Z1 may include a front lens group G1, a rear lens group G2, and an aperture A. The front lens group G1, the aperture A, and the rear lens group G2 are arranged sequentially from an object side F1 toward an image side F2. The object side F1 can be a side in which light enters the input optical lens Z1, and the image side F2 can be a side in which the light leaves the optical lens Z1. In this embodiment, the optical lens Z1 may further include an infrared filter C and a light-transmitting protective cover P. The light that enters the optical lens Z1 may be transmitted from the object side F1 toward the image side F2 so as to form an image on an imaging surface I.

The front lens group G1 has a positive diopter and includes at least two aspheric lenses. In this embodiment, the front lens group G1 may include a first front lens L1, a second front lens L2, a third front lens L3, and a fourth front lens L4 that are sequentially arranged from the object side F1 toward the image side F2. The second front lens L2 and the third front lens L3 may be aspheric lenses and have negative diopters, but are not limited thereto. The second front lens L2 may have a surface 21 that faces an image side, the third front lens L3 may have a surface 30 that faces the object side F1, and the surface 21 and the surface 30 may be concave structures.

The rear lens group G2 has a positive diopter and includes at least one group of adhered lenses and at least one aspheric lens. In this embodiment, the rear lens group G2 may include a first rear lens L5 and a second rear lens L6 sequentially arranged from the object side F1 toward the image side F2. The second rear lens L6 may be an aspheric lens having a positive diopter, but is not limited thereto. The first rear lens L5 may be an adhered lens and include a front lens piece L50, a middle lens piece L51, and a rear lens piece L52. One side of the front lens piece L50 is connected to one side of the middle lens piece L51, and another side of the middle lens piece L51 is connected to one side of the rear lens piece L52, and an absolute value of a difference between a dispersion coefficient of the middle lens piece L51 and a dispersion coefficient of the front lens piece L50 and the rear lens piece L52 is greater than 30. In this embodiment, the middle lens piece L51 has a positive diopter and the front lens piece L50 and the rear lens piece L52 have negative diopters, but are not limited thereto. In practice, at least one of the front lens piece L50, the middle lens piece L51, and the rear lens piece L52 may have a diopter that is different from the aforementioned diopters.

Further, in this embodiment, a total quantity of lenses of the optical lens Z1 can be six, a quantity of aspheric lenses is three, and a quantity of adhered lenses is one, such that quantity of lenses can be effectively reduced and the aberration can be improved. Furthermore, diopters of the first front lens L1, the second front lens L2, the third front lens L3, the fourth front lens L4, the front lens piece L50, the middle lens piece L51, the rear lens piece L52, and the second rear lens L6 of the optical lens Z1 can sequentially be negative, negative, negative, positive, negative, positive, negative, and positive, from the object side F1 toward the image side F2. In addition, materials of the first front lens L1, the second front lens L2, the third front lens L3, the fourth front lens L4, the first rear lens L5, and the second rear lens L6 can sequentially be glass, plastic, plastic, glass, glass, and plastic, from the object side F1 toward the image side F2. That is, materials of the second front lens L2, the third front lens L3, and the second rear lens L6 can be plastic, such that a cost can be effectively reduced. However, the present disclosure is not limited thereto.

In this embodiment, the quantity of lenses having diopters in the optical lens Z1 may range from six to eight to provide optimized cost-effectiveness. Moreover, the optical lens Z1 of the present disclosure may meet a condition of: 17<TTL/EFL<17.5. A TTL is a total length of the optical lens Z1, and an EFL is an effective focal length of the optical lens Z1. Moreover, a value obtained by dividing an EFL of the front lens group G1 of the optical lens Z1 by an EFL of the rear lens group G2 may be between 0.35 and 0.6. That is, 0.6>G1 EFL/G2 EFL>0.35.

Further, the optical lens Z1 of the present disclosure may be an ultra-wide angle fisheye lens having an FOV (field of view) of 185 degrees. The FOV is a maximum field of view of the optical lens Z1. An angle of half of the FOV of the optical lens Z1 corresponds to an image height, and subtracting 80 divided by an image height when the angle of half of the field of view of the optical lens is 80 degrees from 90 divided by an image height when the angle of half of the field of view of the optical lens is 90 degrees meets the condition of: −0.6>90/the image height when the angle of half of the field of view of the optical lens is 90 degrees−80/the image height when the angle of half of the field of view of the optical lens is 80 degrees>−0.4 (i.e., −0.6>90/Half-fov 90°×image height−80/Half-fov 80°×image height>−0.4). Therefore, the optical lens Z1 of the present disclosure can effectively reduce the quantity of lenses, improve the aberration, effectively reduce the cost, and have good optical effect.

Accordingly, a practical design of elements of the optical lens Z1 of the present disclosure is as described in Table 1 below.

TABLE 1

| Number of surface | Radius of curvature (mm) | Thickness (mm) | Refractive index (Nd) | Abbe value (Vd) |
|---|---|---|---|---|
| First front lens L1 | 10 | 18.193 | 0.650 | 2.00 | 25.46 |
| | 11* | 8.060 | 2.877 | | |
| Second front lens L2 | 20* | 23.937 | 1.577 | 1.54 | 56.34 |
| | 21* | 3.100 | 6.008 | | |
| Third front lens L3 | 30* | −5.142 | 4.604 | 1.54 | 55.98 |
| | 31* | −7.772 | 0.100 | | |
| Fourth front lens L4 | 40 | 7.845 | 1.606 | 2.00 | 29.13 |
| | 41 | Infinity | 1.558 | | |
| Aperture A | | Infinity | 1.479 | | |
| First rear lens L5 | 50 | 22.878 | 0.400 | 1.81 | 22.76 |
| | 51 | 4.100 | 3.036 | 1.55 | 75.50 |
| | 52 | −2.965 | 0.400 | 1.95 | 17.98 |
| | 53 | −5.690 | 0.100 | | |
| Second rear lens L6 | 60* | 12.404 | 1.704 | 1.54 | 55.98 |
| | 61* | −8.245 | 3.057 | | |
| Light-transmitting protective cover P | P0 | Infinity | 0.800 | 1.52 | 64 |
| | P1 | Infinity | 0.045 | | |
| Imagining surface I | I0 | Infinity | 0.000 | | |

EFL = 1.7383 mm;
TTL = 30.00 mm;
TTL/EFL = 17.25824081 mm;
G1 EFL = 3.078 mm;
G2 EFL = 8.036 mm;
Fno = 2.00;
half-fov = 90°,
image height = 3.408 mm;
half-fov = 80°,
image height = 2.970 mm;

Referring to FIG. 1 and Table 1, in this embodiment, the first front lens L1 of the optical lens Z1 sequentially has a surface 10 and a surface 11 from the object side F1 toward the image side F2, and the second front lens L2 sequentially has a surface 20 and a surface 21 from object side F1 to image side F2. Because the surface 20 and the surface 21 are aspherical surfaces, the symbol of "*" (as shown in Table 1) is added to the numerals of the surfaces to indicate that the surfaces are aspherical surfaces. Similarly, corresponding aspherical surfaces of various components are accordingly indicated and are not repeated herein. In addition, a TTL is the total length of the optical lens Z1, i.e., a distance from the lens surface of the optical lens Z1 closest to the object side F1 (i.e., the surface 10 of the first front lens L1) to the imaging surface I along the optical axis T, an Fno is an aperture value of the optical lens Z1, a half-fov is a half field of view of the optical lens Z1, i.e., half of the maximum field of view of the optical lens Z1, and an image height is an image height of the optical lens Z1.

It should be noted that, each of intervals as described in Table 1 indicates a distance from a surface to a next surface from the object side F1 toward the image side F2. For example, a thickness of the first front lens L1 is 18.193 mm, a thickness of the second front lens L2 is 23.937 mm, and a distance between two adjacent surfaces of the first front lens L1 and the second front lens L2 is 8.060 mm. Accordingly, other intervals as described in Table 1 can be inferred and are not reiterated herein.

Moreover, the radius of curvature in Table 1 is the radius of curvature of the surface, and the positive and negative values represent the direction of bending. For example, the radius of curvature of the surface 10 of the first front lens L1 is positive, and the radius of curvature of the surface 11 of the first front lens L1 is positive. Therefore, the first front lens L1 is a convex-concave lens. In addition, the surface 60 of the second rear lens L6 has a positive radius of curvature, and the surface 61 of the second rear lens L6 has a negative radius of curvature. Therefore, the second rear lens L6 is a biconvex lens. Surfaces of other lenses can be described by the same manner and are not reiterated herein.

Furthermore, Table 2 below shows the quadratic surface coefficients K for each aspheric surface and the aspheric surface coefficients A to H for each order, and an aspherical polynomial can be represented by the following equation (1):

$$X = \frac{CY^2}{1 + \sqrt{1 - (1+K)C^2Y^2}} + AY^4 + \qquad (1)$$

$$BY^6 + CY^8 + DY^{10} + EY^{12} + FY^{14} + GY^{16} + HY^{20} C = \frac{1}{R}.$$

In detail, X is an offset (an optical sag) along a direction of the optical axis T; C is a reciprocal of a radius of an osculating sphere, that is, a reciprocal of the radius of curvature near the optical axis T; K is the quadratic coefficient of curvature; Y is an aspherical height, that is, a height from the center of the lens to the edge of the lens; A to H represent the aspherical coefficients of the various orders of the aspherical polynomial, respectively.

lens L7' may be an aspheric lens and have a positive diopter, but is not limited thereto. The first rear lens L6' may be an adhered lens and include a front lens piece L60', a middle lens piece L61', and a rear lens piece L62'. An absolute value of a difference between a dispersion coefficient of the middle lens piece L61' and a dispersion coefficient of the front lens piece L60' and the rear lens piece L62' is greater than 30.

Moreover, diopters of the first front lens L1', the second front lens L2', the third front lens L3', the fourth front lens L4', the fifth front lens L5', the front lens piece L60', the middle lens piece L61', the rear lens piece L62', and the second rear lens L7' of the optical lens Z2 can sequentially be negative, negative, negative, negative, positive, negative, positive, negative, and positive, from the object side F1 toward the image side F2. In addition, materials of the first front lens L1', the second front lens L2', the third front lens L3', the fourth front lens L4', the fifth front lens L5', the front rear lens L6', and the second rear lens L7' can sequentially be glass, glass, plastic, plastic, glass, glass, and plastic, from the object side F1 toward the image side F2. That is, materials of the third front lens L3', the fourth front lens L4', and the second rear lens L7' can be plastic, such that a cost can be effectively reduced. However, the present disclosure is not limited thereto.

In this embodiment, a practical design of the aforementioned elements is as described in Table 3 below. Details

TABLE 2

| | | Number of surface | | | | | |
|---|---|---|---|---|---|---|---|
| | | 20 | 21 | 30 | 31 | 60 | 61 |
| Conic coefficient | K | 7.90E+00 | −7.39E−01 | −2.62E+00 | −2.21E+00 | −6.91E+00 | 1.82E+00 |
| Aspherical coefficients | A | 4.68E−03 | 7.07E−03 | −1.58E−03 | 2.94E−05 | −1.05E−03 | −2.08E−04 |
| | B | −2.89E−04 | 3.93E−04 | 1.38E−05 | 1.07E−05 | −2.45E−04 | −3.69E−04 |
| | C | 8.72E−06 | −1.48E−04 | 5.92E−06 | 4.06E−07 | 2.85E−05 | 4.68E−05 |
| | D | −1.52E−07 | 1.22E−05 | −7.08E−07 | −6.78E−08 | −3.20E−06 | −3.61E−06 |
| | E | 1.46E−09 | −4.38E−07 | 4.08E−08 | 7.71E−09 | 1.65E−07 | 8.97E−08 |
| | F | −6.03E−12 | 5.88E−09 | −8.87E−10 | −2.36E−10 | −6.74E−10 | 2.37E−09 |
| | G | 0 | 0 | 0 | 0 | 0 | 0 |
| | H | 0 | 0 | 0 | 0 | 0 | 0 |

Second Embodiment

Figure 4:
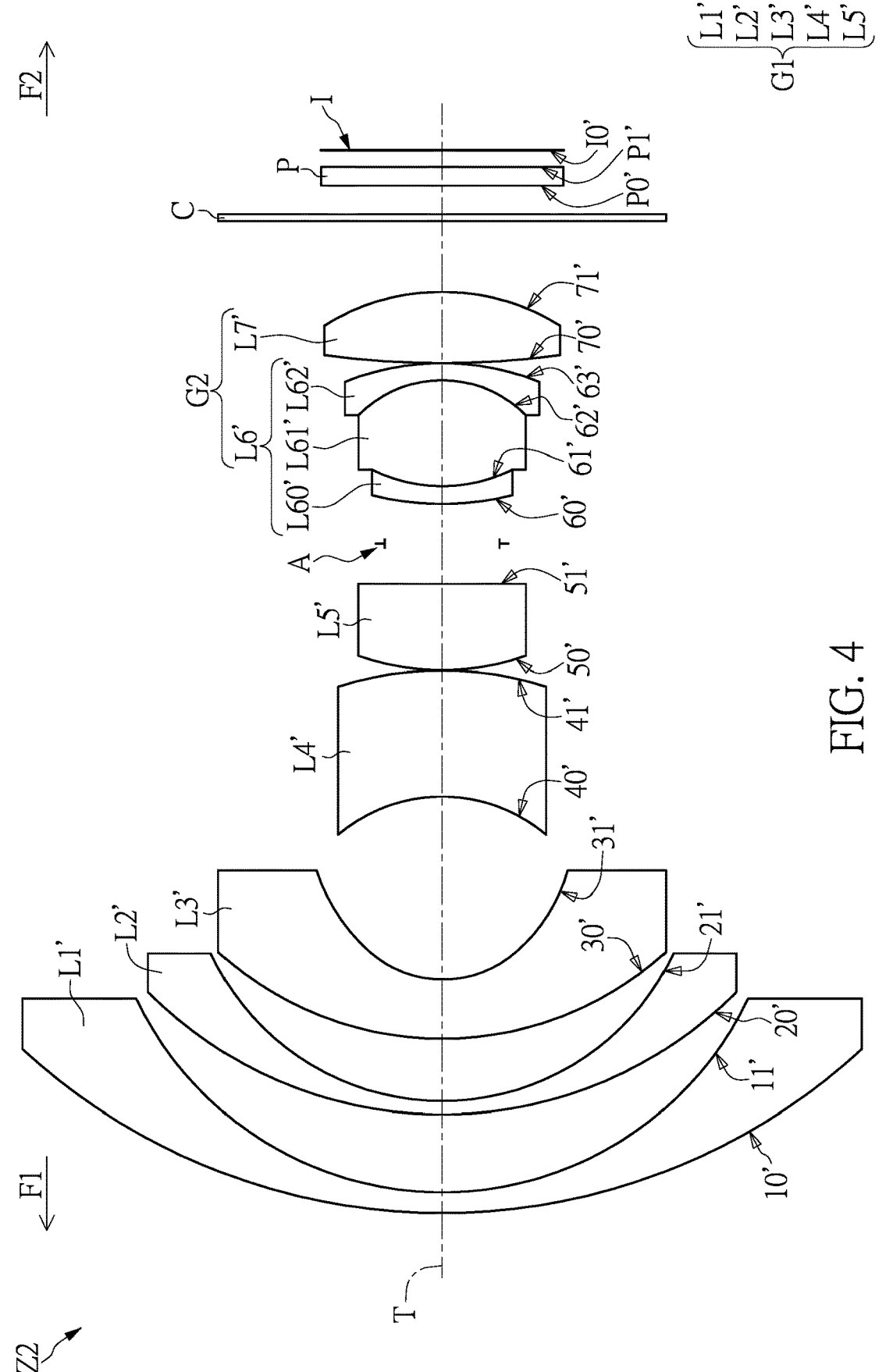
FIG. 4 is a schematic view of a structure of an optical lens of a second embodiment according to the present disclosure.

Referring to FIG. 4, FIG. 4 is a schematic view of a structure of an optical lens of a second embodiment according to the present disclosure. An optical lens Z2 of this embodiment is substantially similar to the optical lens Z1 of the aforementioned first embodiment, such that configurations or operations of similar elements will not be reiterated herein. The difference between this embodiment and the aforementioned first embodiment is that, in this embodiment, the front lens group G1 may further include a fifth front lens L5'. That is, the front lens group G1 may include a first front lens L1', a second front lens L2', a third front lens L3', a fourth front lens L4', and the fifth front lens L5' sequentially arranged from the object side F1 toward the image side F2. Furthermore, the third front lens L3' and the fourth front lens L4' may be aspheric and have negative diopters, but are not limited thereto. The third front lens L3' may have a surface 31', the fourth front lens L4' may have a surface 40', and the surface 31' and the surface 40' may be concave structures.

The rear lens group G2 may include a first rear lens L6' and a second rear lens L7' sequentially arranged from the object side F1 toward the image side F2. The second rear regarding the content of Table 3 are similar to that of Table 1, and will not be reiterated herein.

TABLE 3

| Number of surface | Radius of curvature (mm) | Thickness (mm) | Refractive index (Nd) | Abbe value (Vd) |
|---|---|---|---|---|
| First front lens L1' | 10' | 17.254 | 0.621 | 2.00 | 25.46 |
| | 11' | 9.451 | 2.151 | | |
| Second front lens L2' | 20' | 11.633 | 0.400 | 1.77 | 49.62 |
| | 21' | 7.236 | 1.823 | | |
| Third front lens L3' | 30'* | 26.361 | 1.614 | 1.54 | 55.71 |
| | 31'* | 3.287 | 5.148 | | |
| Fourth front lens L4' | 40'* | −4.040 | 3.570 | 1.54 | 55.71 |
| | 41'* | −7.397 | 0.097 | | |
| Fifth front lens L5' | 50' | 7.704 | 2.400 | 2.00 | 29.13 |
| | 51' | Infinity | 1.097 | | |
| Aperture A | | Infinity | 1.145 | | |
| First rear lens L6' | 60' | 6.843 | 0.488 | 1.87 | 20.02 |
| | 61' | 3.985 | 3.053 | 1.50 | 81.61 |
| | 62' | −3.122 | 0.399 | 1.95 | 17.98 |
| | 63' | −7.869 | 0.097 | | |

TABLE 3-continued

| Number of surface | Radius of curvature (mm) | Thickness (mm) | Refractive index (Nd) | Abbe value (Vd) |
|---|---|---|---|---|
| Second rear lens L7' | 70'* | 16.104 | 1.988 | 1.54 | 55.71 |
| | 71'* | −5.647 | 3.062 | | |
| Light-transmitting protective cover P | P0 | Infinity | 0.800 | 1.52 | 64 |
| | P1 | Infinity | 0.050 | | |
| Imagining surface I | I0 | Infinity | 0.000 | | |

EFL = 1.7417 mm;
TTL = 30.00 mm;
TTL/EFL = 17.22455073 mm;
G1 EFL = 4.503 mm;
G2 EFL = 7.843 mm;
Fno = 2.00;
half-fov = 90°,
image height = 3.407 mm;
half-fov = 80°,
image height = 2.966 mm;

Furthermore, Table 4 provides K and A to H respectively for each of the aspherical lenses, K being the quadratic coefficient of curvature, and A to H representing the aspherical coefficients of the various orders of the aspherical polynomial, respectively.

TABLE 4

| | | Number of the surface | | | | | |
|---|---|---|---|---|---|---|---|
| | | 30' | 31' | 40' | 41' | 70' | 71' |
| Conic coefficient | K | 1.42E+01 | −6.26E−01 | −1.68E+00 | −8.98E−01 | 1.45E+01 | 1.68E−01 |
| Aspherical coefficients | A | 4.88E−03 | 6.70E−03 | −1.76E−03 | 4.60E−04 | −9.31E−04 | 2.16E−03 |
| | B | −2.80E−04 | 4.81E−04 | 2.75E−05 | 6.73E−05 | −2.88E−04 | −3.42E−04 |
| | C | 8.61E−06 | −1.50E−04 | 2.51E−07 | −3.60E−05 | 5.71E−05 | 4.11E−05 |
| | D | −1.53E−07 | 1.25E−05 | 5.44E−07 | 1.06E−05 | −4.60E−06 | −2.31E−06 |
| | E | 1.47E−09 | −4.18E−07 | −1.00E−07 | −1.39E−06 | 1.74E−07 | 9.69E−08 |
| | F | −5.96E−12 | 4.80E−09 | 6.58E−09 | 6.95E−08 | −2.39E−09 | −2.27E−09 |
| | G | 0 | 0 | 0 | 0 | 0 | 0 |
| | H | 0 | 0 | 0 | 0 | 0 | 0 |

Third Embodiment

Figure 7:
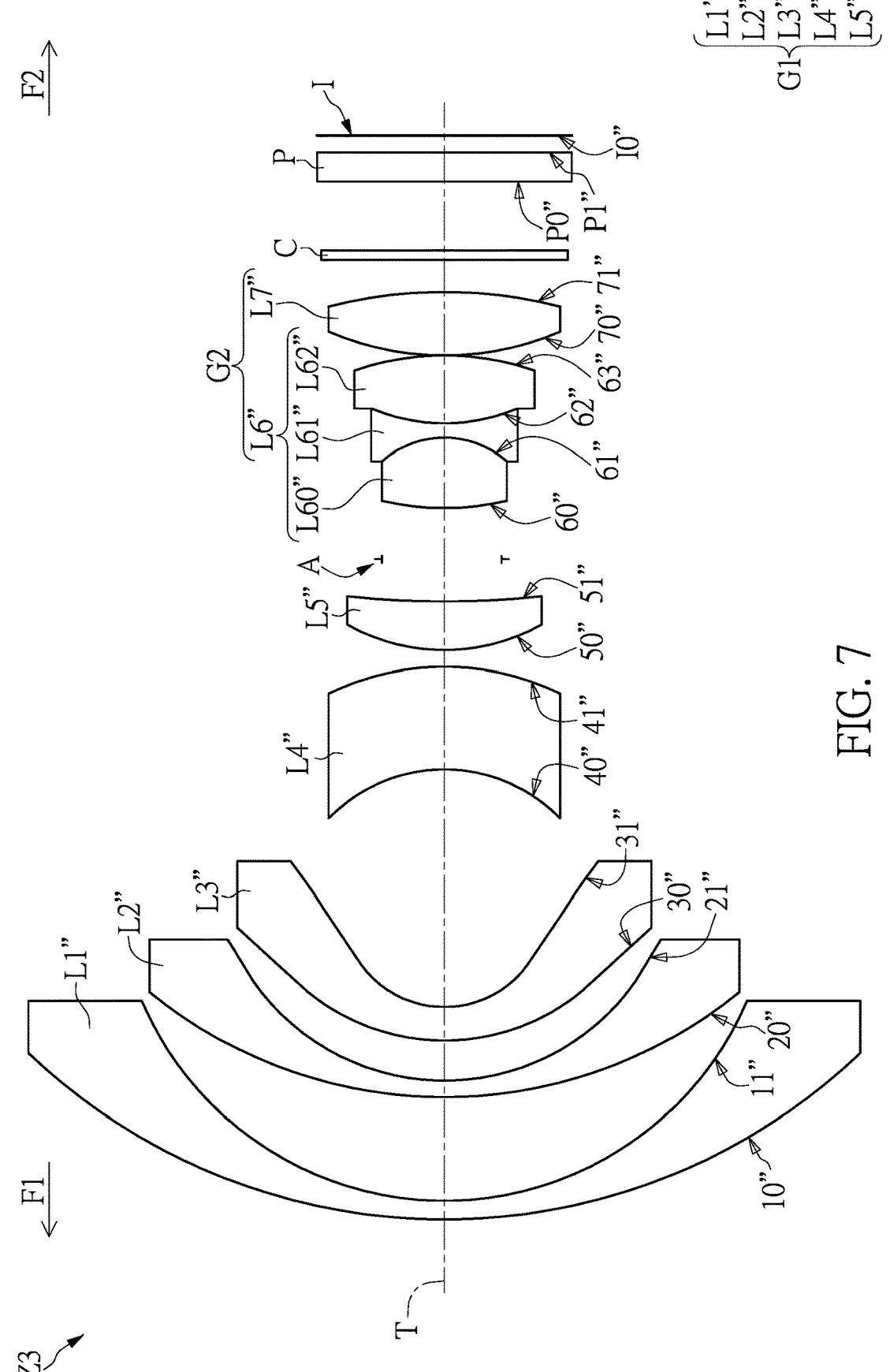
FIG. 7 is a schematic view of a structure of an optical lens of a third embodiment according to the present disclosure.

Referring to FIG. 7, FIG. 7 is a schematic view of a structure of an optical lens of a third embodiment according to the present disclosure. An optical lens Z3 of this embodiment is substantially similar to the optical lens Z2 of the aforementioned second embodiment, such that configurations or operations of similar elements will not be repeated herein. The difference between this embodiment and the second embodiment is that, in this embodiment, diopters of a first front lens L1", a second front lens L2", a third front lens L3", a fourth front lens L4", a fifth front lens L5", a front lens piece L60", a middle lens piece L61", a rear lens piece L62", and a second rear lens L7" in the optical lens Z3 can sequentially be negative, negative, negative, negative, positive, positive, negative, positive, and positive, from the object side F1 toward the image side F2.

Therefore, in this embodiment, the front lens group G1 may sequentially include the first front lens L1", the second front lens L2", the third front lens L3", the fourth front lens L4", and the fifth front lens L5" arranged from the object side F1 toward the image side F2. Moreover, the rear lens group G2 may sequentially include a first rear lens L6" and the second rear lens L7" arranged from the object side F1 toward the image side F2. The first rear lens L6" may be an adhered lens and include the front lens piece L60", a middle lens piece L61", and a rear lens piece L62".

In this embodiment, a practical design of the aforementioned elements is as described in Table 5 below. Details regarding the content of Table 5 are similar to that of Table 1 or Table 3, and will not be reiterated herein.

TABLE 5

| | Number of surface | Radius of curvature (mm) | Thickness (mm) | Refractive index (Nd) | Abbe value (Vd) |
|---|---|---|---|---|---|
| First front lens L1" | 10" | 17.390 | 0.500 | 2.00 | 25.46 |
| | 11" | 9.343 | 2.919 | | |
| Second front lens L2" | 20"* | 13.748 | 0.454 | 1.73 | 54.67 |
| | 21"* | 6.752 | 1.119 | | |
| Third front lens L3" | 30"* | 6.632 | 0.952 | 1.54 | 55.71 |
| | 31"* | 2.661 | 6.651 | | |
| Fourth front lens L4" | 40"* | −4.004 | 2.882 | 1.54 | 55.71 |
| | 41"* | −6.346 | 0.543 | | |
| Fifth front lens L5" | 50" | 5.944 | 1.399 | 1.85 | 23.78 |
| | 51" | 179.4766896 | 1.111 | | |
| Aperture A | | Infinity | 1.528 | | |
| First rear lens L6" | 60" | 12.590 | 1.852 | 1.77 | 49.62 |
| | 61" | −2.861 | 0.449 | 2.00 | 19.32 |
| | 62" | 5.980 | 1.831 | 1.62 | 63.40 |
| | 63" | −9.853 | 0.096 | | |

TABLE 5-continued

| | Number of surface | Radius of curvature (mm) | Thickness (mm) | Refractive index (Nd) | Abbe value (Vd) |
|---|---|---|---|---|---|
| Second rear lens L7" | 70"* | 7.924 | 1.818 | 1.64 | 23.50 |
| | 71"* | −14.071 | 3.047 | | |
| Light-transmitting protective cover P | P0 | Infinity | 0.800 | 1.52 | 64 |
| | P1 | Infinity | 0.050 | | |
| Imagining surface I | I0 | Infinity | 0.000 | | |

EFL = 1.74 mm;
TTL = 29.950 mm;
TTL/EFL = 17.19584314 mm;
G1 EFL = 3.252 mm;
G2 EFL = 8.749 mm;
Fno = 2.00;
half-fov = 90°,
image height = 3.416 mm;
half-fov = 80°,
image height = 2.985 mm;

11

12

Furthermore, Table 6 provides K and A to H respectively for each of the aspherical lenses, K being the quadratic coefficient of curvature, and A to H representing the aspherical coefficients of the various orders of the aspherical polynomial, respectively.

light having a wavelength of 610 nm, and line S1 represents measurements taken for light having a wavelength of 650 nm. Accordingly, FIG. 2, FIG. 3, FIG. 5, FIG. 6, FIG. 8, and FIG. 9 show that the longitudinal aberration, the astigmatic field curvature, and the distortion of the optical lens (Z1, Z2,

TABLE 6

| | | Number of the surface | | | | | |
|---|---|---|---|---|---|---|---|
| | | 30" | 31" | 40" | 41" | 60" | 61" |
| Conic coefficient | K | −1.71E+00 | −6.89E−01 | −9.51E−01 | −1.39E−01 | −5.92E−01 | 5.91E+00 |
| Aspherical coefficients | A | 2.75E−03 | 2.65E−03 | 6.09E−05 | 1.04E−03 | −4.59E−04 | 7.76E−04 |
| | B | −9.36E−05 | 3.21E−05 | −1.16E−05 | 2.60E−06 | 9.85E−06 | −5.90E−05 |
| | C | 9.50E−07 | −1.66E−05 | 4.02E−06 | 2.45E−06 | −1.90E−07 | 2.32E−06 |
| | D | −9.54E−10 | −1.76E−07 | −6.10E−07 | 0 | −9.70E−08 | −2.61E−08 |
| | E | 0 | 2.49E−08 | 5.53E−08 | 0 | −1.91E−10 | −5.71E−09 |
| | F | 0 | −8.78E−10 | −1.53E−09 | 0 | 3.58E−10 | −3.47E−10 |
| | G | 0 | 0 | 0 | 0 | 7.16E−12 | 5.12E−11 |
| | H | 0 | 0 | 0 | 0 | 0 | 0 |

Figure 2:
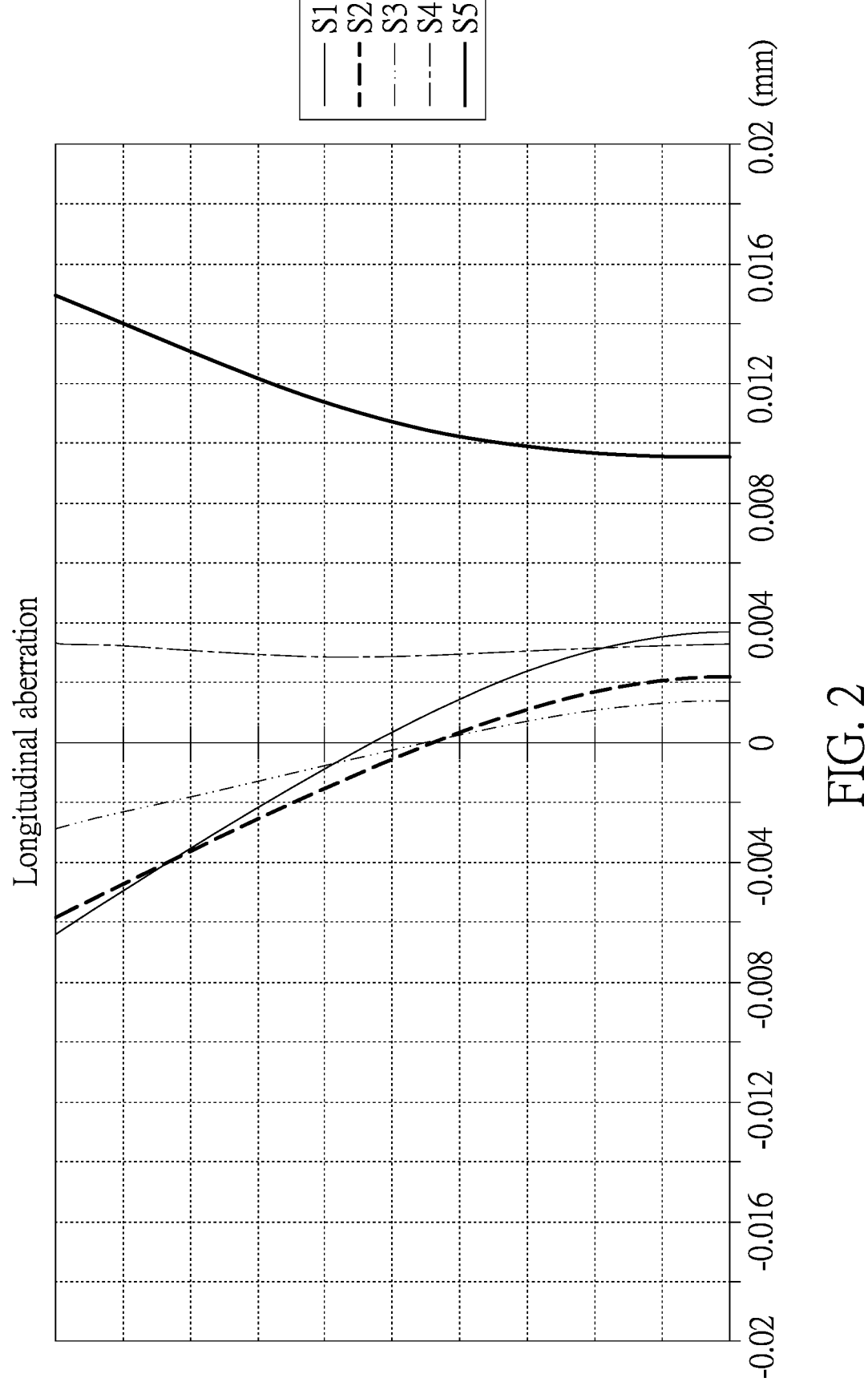
FIG. 2 shows a longitudinal aberration diagram of the first embodiment according to the present disclosure.
Figure 3:
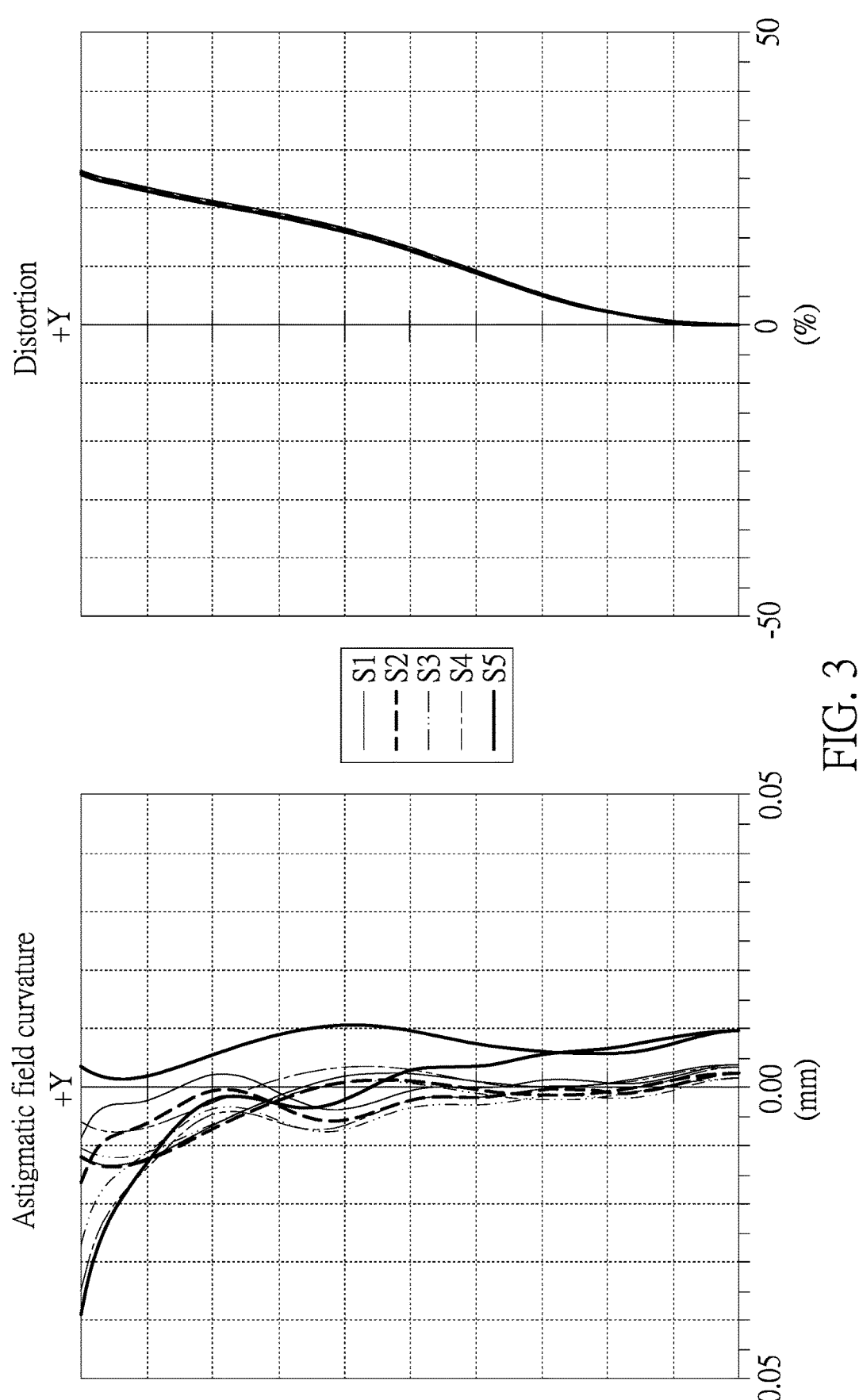
FIG. 3 shows an astigmatic field curvature diagram and a distortion diagram of the first embodiment according to the present disclosure.
Figure 5:
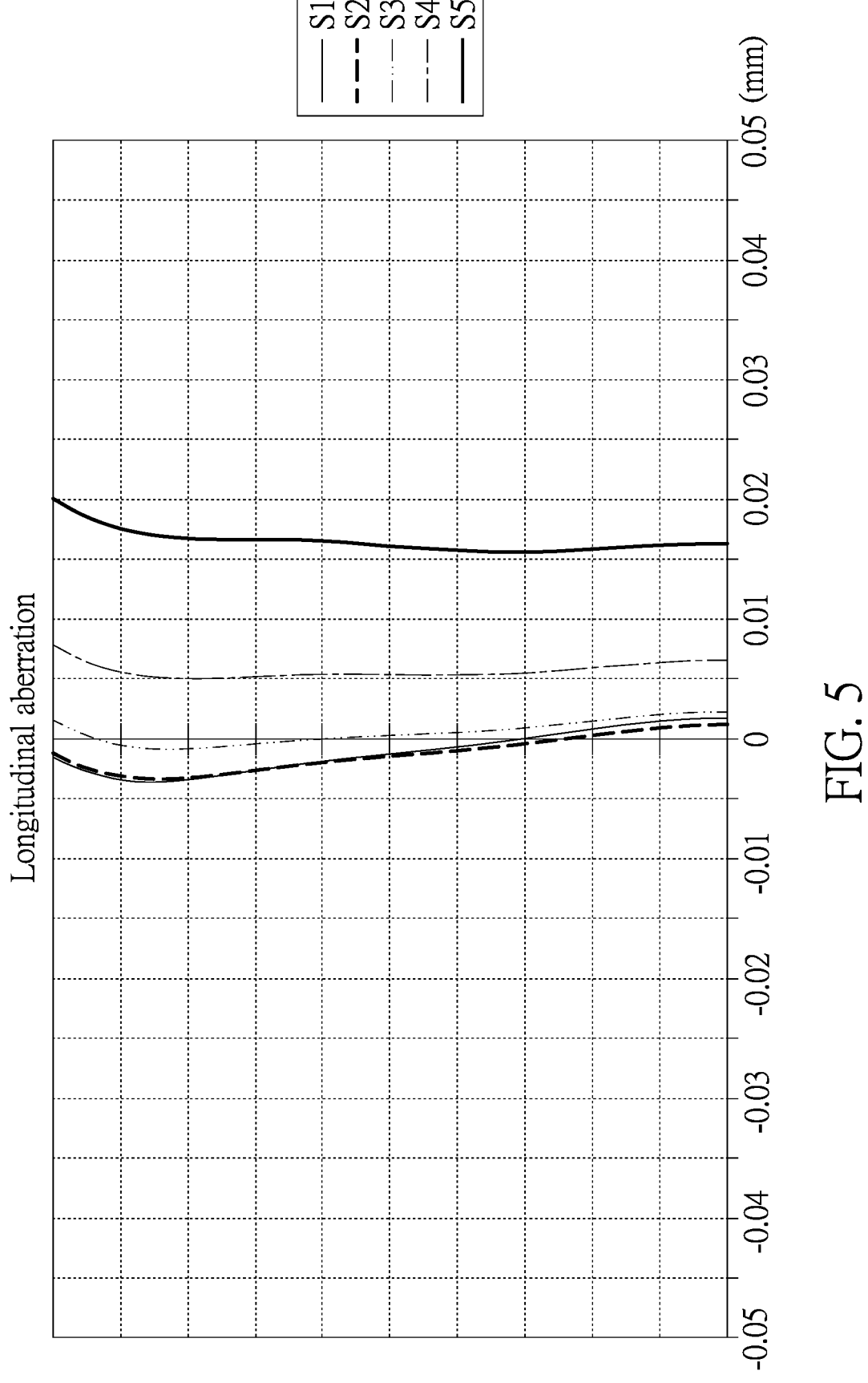
FIG. 5 shows a longitudinal aberration diagram of the second embodiment according to the present disclosure.
Figure 6:
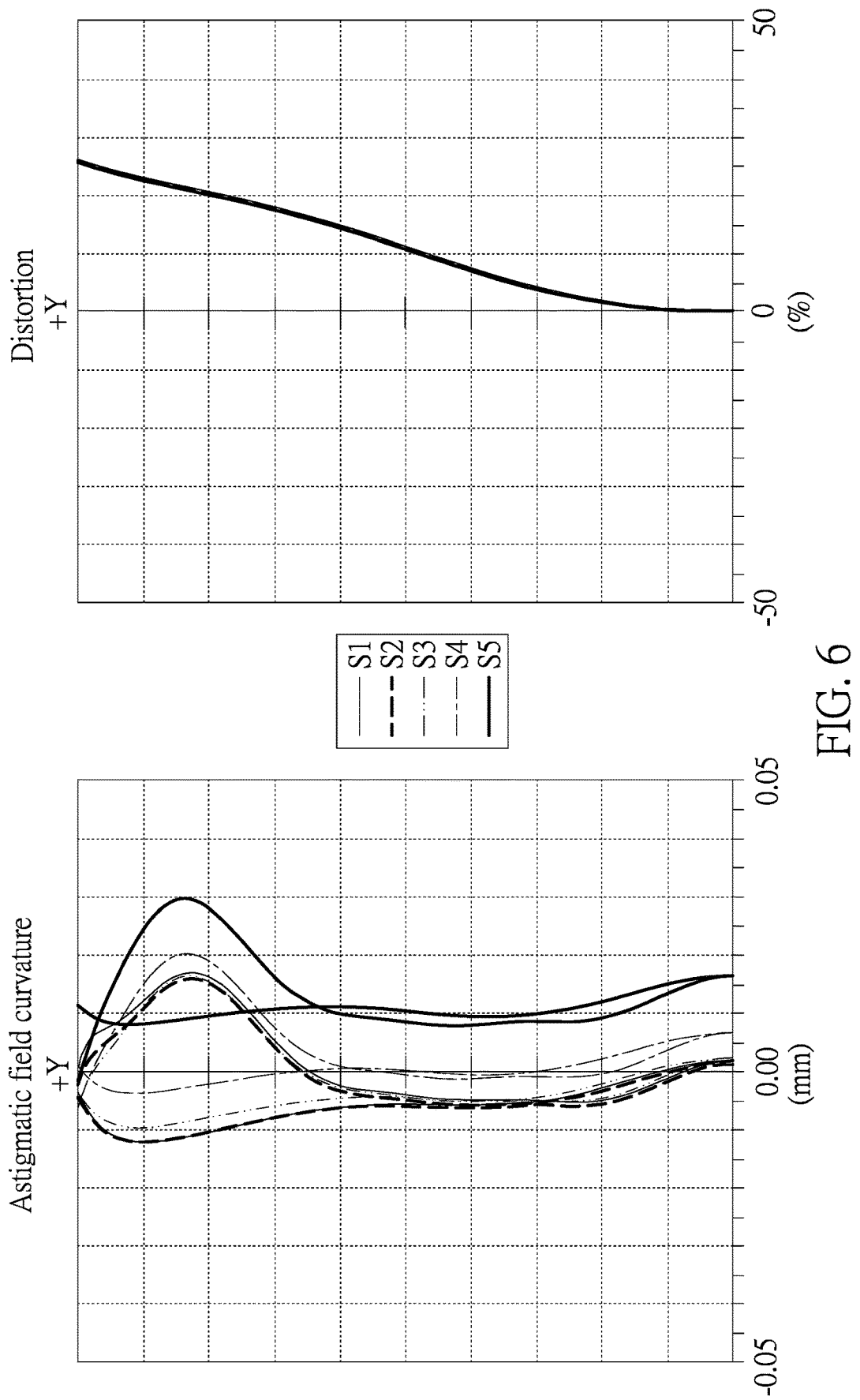
FIG. 6 shows an astigmatic field curvature diagram and a distortion diagram of the second embodiment according to the present disclosure.
Figure 8:
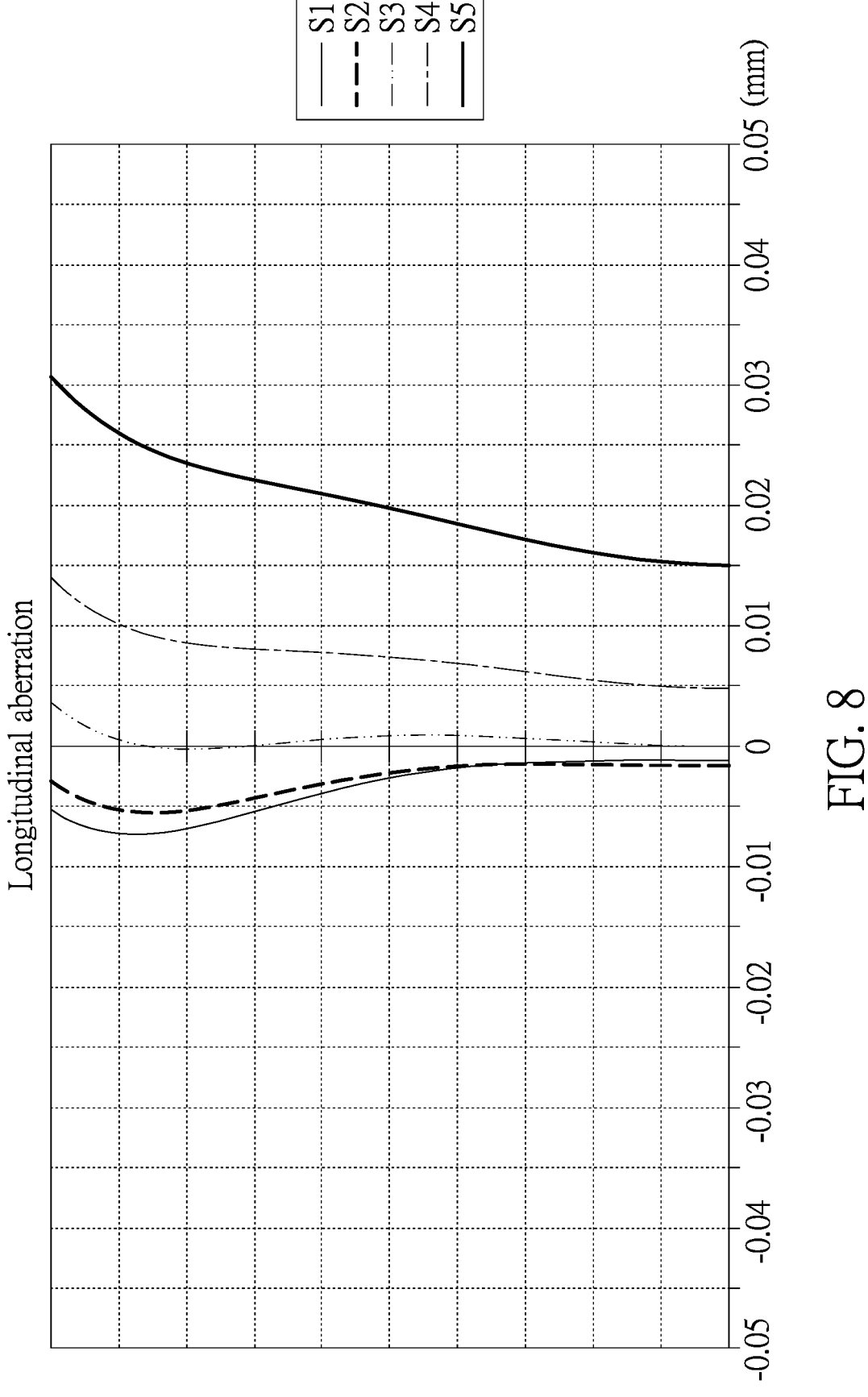
FIG. 8 shows a longitudinal aberration diagram of the third embodiment according to the present disclosure.
Figure 9:
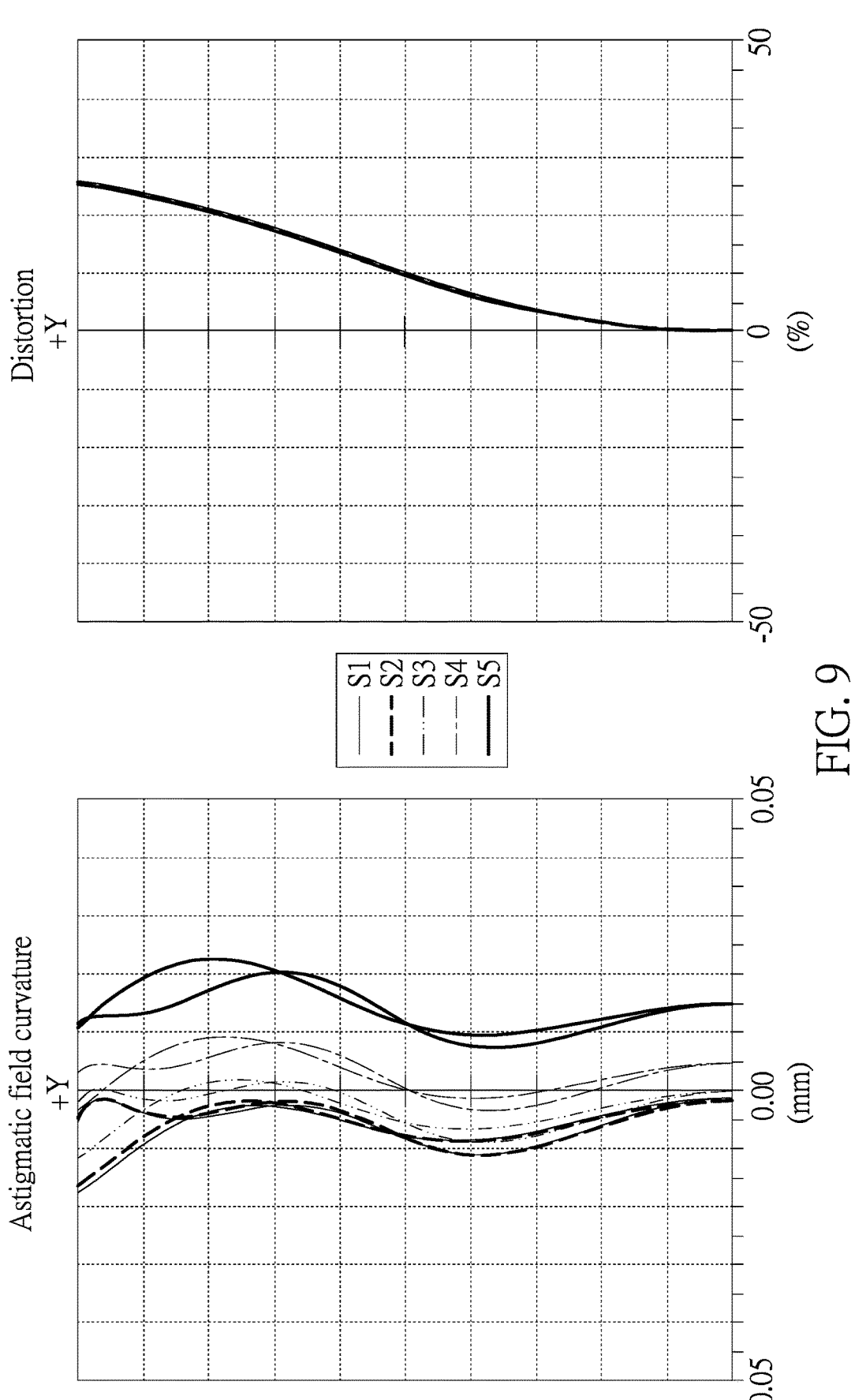
FIG. 9 shows an astigmatic field curvature diagram and a distortion diagram of the third embodiment according to the present disclosure.

Referring to FIG. 2, FIG. 3, FIG. 5, FIG. 6, FIG. 8, and FIG. 9, FIG. 2 shows a longitudinal aberration diagram of the first embodiment according to the present disclosure, FIG. 3 shows an astigmatic field curvature diagram and a distortion diagram of the first embodiment according to the present disclosure, FIG. 5 shows a longitudinal aberration diagram of the second embodiment according to the present disclosure, FIG. 6 shows an astigmatic field curvature diagram and a distortion diagram of the second embodiment according to the present disclosure, FIG. 8 shows a longitudinal aberration diagram of the third embodiment according to the present disclosure, and FIG. 9 shows an astigmatic field curvature diagram and a distortion diagram of the third embodiment according to the present disclosure.

FIG. 2, FIG. 5, and FIG. 8 are longitudinal aberration diagrams of the optical lens (Z1, Z2, and Z3). In FIG. 2, FIG. 5, and FIG. 8, the longitudinal aberrations that are intersections of an optical axis and lights having different wavelengths and pupil heights are shown. In these diagrams, the horizontal axis represents distances (in millimeters) from an imaging surface I to the intersections of the optical axis and the lights having different wavelengths, the vertical axis represents normalized pupil heights, and different styles of the curves represent different measurements taken for the lights having different wavelengths. FIG. 3, FIG. 6, and FIG. 9 show astigmatic field curvature diagrams and distortion diagrams of the optical lens (Z1, Z2, and Z3), respectively. The diagrams on the left side of FIG. 3, FIG. 6, and FIG. 9 are the astigmatic field curvature diagram of the optical lens (Z1, Z2, and Z3). In these diagrams, the horizontal axis represents the focal point displacement (in millimeters), the vertical axis represents the image height, and different styles of the curves represent different measurements taken for the lights having different wavelengths. The diagrams on the right side of FIG. 3, FIG. 6, and FIG. 9 are the distortion diagram of the optical lens (Z1, Z2, and Z3). In these diagrams, the horizontal axis represents the percentage of distortion (%), the vertical axis represents the image height, and different styles of the curves represent different measurements taken for the lights having different wavelengths. Moreover, in FIG. 2, FIG. 3, FIG. 5, FIG. 6, FIG. 8, and FIG. 9, line S5 represents measurements taken for light having a wavelength of 470 nm, line S4 represents measurements taken for light having a wavelength of 510 nm, line S3 represents measurements taken for light having a wavelength of 555 nm, line S5 represents measurements taken for and Z3) of the present disclosure are within a standard range for lights having a wavelength of from 450 nm to 650 nm, and the optical lens (Z1, Z2, and Z3) of the present disclosure has a good optical imaging quality.

However, examples provided in the aforementioned embodiments are only some of the possible implementations, and are not intended to limit the present disclosure.

Beneficial Effects of the Embodiments

In conclusion, in the optical lens (Z1, Z2, and Z3) provided by the present disclosure, by virtue of "the front lens group G1 including a plurality of front lenses; the plurality of front lenses including at least two aspherical lenses, one of the at least two aspherical lenses being a negative lens and having a surface facing an image side, another one of the at least two aspherical lenses being a negative lens and having a surface facing an object side, and the surface of the one of the at least two aspherical lenses and the surface of the another one of the at least two aspherical lenses being concave surfaces; the rear lens group G2 including a plurality of rear lenses; the plurality of rear lenses including at least one adhered lens and an aspheric lens; the aperture A being located between the front lens group G1 and the rear lens group G2; the front lens group G1 and the rear lens group G2 having positive diopters, and a total quantity of lenses of the plurality of front lenses and the plurality of rear lenses being at least four; the optical lens (Z1, Z2, and Z3) meeting a condition of: 0.6>an effective focal length of the front lens group/an effective focal length of the rear lens group>0.35," a quantity of lenses can be effectively reduced, an optical aberration can be improved, and the manufacturing cost can be lowered for the optical lens. Furthermore, the optical lens can have an improved optical effect.

Accordingly, by means of the above mentioned technical solutions, the optical lens (Z1, Z2, and Z3) of the present disclosure can be applied to a 12 M high performance lens (i.e., a lens having a high resolution of 12 million pixels corresponding to a 125 lp/mm high resolution sensor). In terms of temperature compensation, an offset can be controlled to be less than 3 μm in an ambient temperature (e.g., from −30 degrees to 70 degrees Celsius). Optical aberrations of the optical lens (Z1, Z2, and Z3) of the present disclosure are positive, such that an edge angle magnification is greater than a center angle magnification, and an F-theta distortion can be greater than 20% in the optical lens of the present disclosure. Moreover, the optical lens (Z1, Z2, and Z3) of the present disclosure has the same focal point in both daytime and nighttime, and a focus shift between visible light and infrared light having a wavelength of 850 nm in the optical lens can be less than 0.01 mm.

In addition, the optical lens (Z1, Z2, and Z3) of the present disclosure uses a plurality of aspherical lenses to enhance a resolving performance, and uses a positive diopter lens to receive light in a wide angle, thereby effectively reducing the quantity of lenses, improving aberrations, reducing costs, and improving optical effects.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optical lens, comprising:
a front lens group including a plurality of front lenses, wherein the plurality of front lenses include at least two aspherical lenses, one of the at least two aspherical lenses is a negative lens and has a surface facing an image side, another one of the at least two aspherical lenses is a negative lens and has a surface facing an object side, and the surface of the one of the at least two aspherical lenses and the surface of the another one of the at least two aspherical lenses are concave surfaces;
a rear lens group including a plurality of rear lenses, wherein the plurality of rear lenses include at least one adhered lens and an aspheric lens; and
an aperture located between the front lens group and the rear lens group;
wherein the front lens group and the rear lens group have positive diopters, and a total quantity of lenses of the plurality of front lenses and the plurality of rear lenses is at least four;
wherein the optical lens meets a condition of: 0.6>an effective focal length of the front lens group/an effective focal length of the rear lens group>0.35; and
wherein the optical lens meets a condition of: 17<TTL/EFL<17.5, a TTL being a total length of the optical lens, and an EFL being an effective focal length of the optical lens.

2. The optical lens according to claim 1, wherein the plurality of rear lenses include a first rear lens and a second rear lens sequentially arranged from the object side toward the image side, the first rear lens being an adhered lens, and the second rear lens being an aspherical lens; wherein the first rear lens includes a front lens piece, a middle lens piece, and a rear lens piece, the front lens piece is connected to one side of the middle lens piece, and the rear lens piece is connected to another side of the middle lens piece; wherein an absolute value of a difference between a dispersion coefficient of the middle lens piece and a dispersion coefficient of the front lens piece and the rear lens piece is greater than 30.

3. The optical lens according to claim 2, wherein the plurality of front lenses include a first front lens, a second front lens, a third front lens, and a fourth front lens sequentially arranged from the object side toward the image side, the second front lens and the third front lens being aspherical lenses.

4. The optical lens according to claim 3, wherein diopters of the first front lens, the second front lens, the third front lens, the fourth front lens, the front lens piece, the middle lens piece, the rear lens piece, and the second rear lens are negative, negative, negative, positive, negative, positive, negative, and positive, in a sequence of the first front lens, the second front lens, the third front lens, the fourth front lens, the front lens piece, the middle lens piece, the rear lens piece, and the second rear lens.

5. The optical lens according to claim 3, wherein the first front lens, the fourth front lens, and the first rear lens are made of glass, and the second front lens, the third front lens, and the second rear lens are made of plastic.

6. The optical lens according to claim 2, wherein the plurality of front lenses include a first front lens, a second front lens, a third front lens, a fourth front lens, and a fifth front lens sequentially from the object side toward the image side, the third front lens and the fourth front lens being aspherical lenses.

7. The optical lens according to claim 6, wherein diopters of the first front lens, the second front lens, the third front lens, the fourth front lens, the fifth front lens, the front lens piece, the middle lens piece, the rear lens piece, and the second rear lens are negative, negative, negative, negative, positive, negative, positive, negative, and positive, or negative, negative, negative, negative, positive, positive, negative, positive, and positive, in a sequence of the first front lens, the second front lens, the third front lens, the fourth front lens, the fifth front lens, the front lens piece, the middle lens piece, the rear lens piece, and the second rear lens.

8. The optical lens according to claim 6, wherein the first front lens, the second front lens, the fifth front lens, and the first rear lens are made of glass, and the third front lens, the fourth front lens, and the second rear lens are made of plastic.

9. The optical lens according to claim 1, wherein an angle of a field of view of the optical lens is less than or equal to 185 degrees; wherein a relationship of an angle of half of the field of view of the optical lens corresponding to an image height meets a condition of: $-0.6>90/\text{Half-fov } 90°×\text{image height}-80/\text{Half-fov } 80°×\text{image height}>-0.4$.

* * * * *